W. H. HAWES.
Pigeon-Trap.
No. 223,344. Patented Jan. 6, 1880.
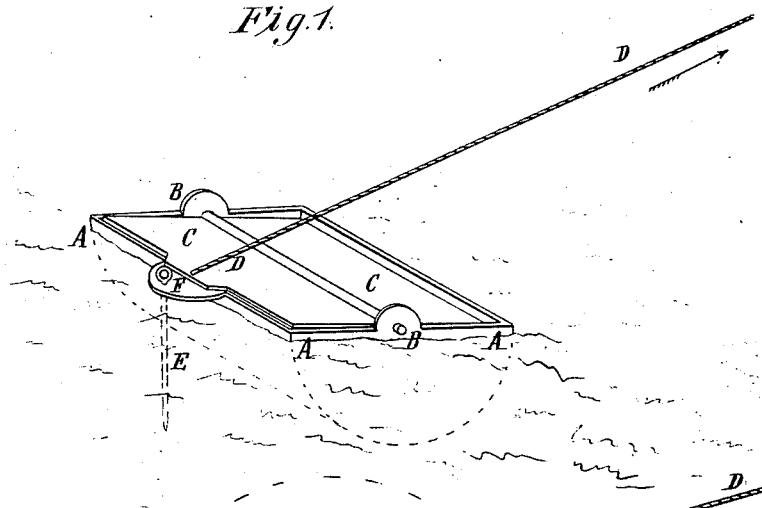
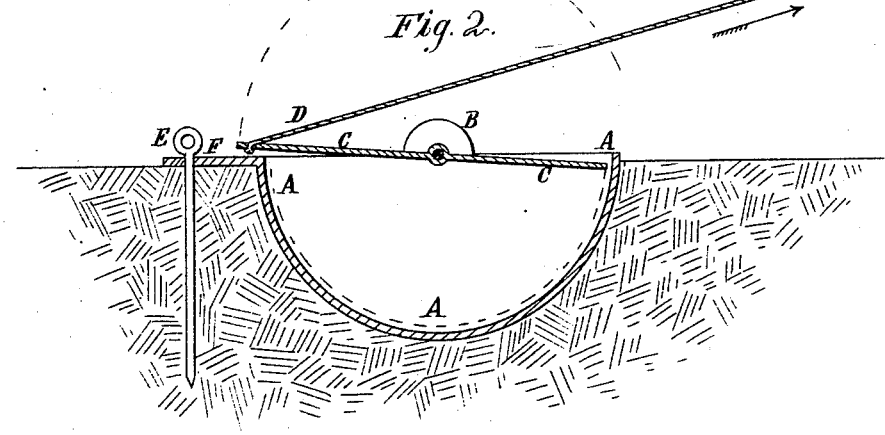
WITNESSES:
Henry N. Miller
C. Sedgwick
INVENTOR:
W. H. Hawes
BY Munn & Co
ATTORNEYS.

UNITED STATES PATENT OFFICE.

WILLIAM H. HAWES, OF NEW YORK, N. Y.

PIGEON-TRAP.

SPECIFICATION forming part of Letters Patent No. 223,344, dated January 6, 1880.

Application filed September 22, 1879.

*To all whom it may concern:*

Be it known that I, WILLIAM H. HAWES, of the city, county, and State of New York, have invented a new and Improved Pigeon-Trap, of which the following is a specification.

Figure 1 is a perspective view of my improved trap. Fig. 2 is a sectional side elevation of the trap.

The object of this invention is to furnish a pigeon-trap so constructed as to prevent the birds from remaining in the trap after the trap is sprung.

The invention consists in combining a semi-cylindrical box, a middle pivoted cover, and a cord, as hereinafter described.

The box A of the trap is made semi-cylindrical, as shown in Figs. 1 and 2, and is designed to be set in the ground to such a depth that its upper edge may be flush with or but little above the surface of the ground.

To lugs or eyes B formed upon or attached to the centers of the end edges of the box A are pivoted the centers of the ends of the cover C. The cover C is made of such a size that when turned upon its pivots the rear side edge of the cover C may move along the inner surface of the box A, as indicated by the dotted lines in Fig. 2.

To the center of the forward side edge of the cover C is attached the end of the cord D, by means of which the said cover C is operated.

The box A may be kept from moving in its seat when in use by one or more pins, E, driven into the ground through holes in lugs F, formed upon or attached to the edge of the box A, as shown in Figs. 1 and 2.

In using the trap the forward edge of the cover C is raised, the bird is placed in the box A, and the cover C is again closed. Then at the proper time the cover is turned upon its pivots through a half-revolution by pulling upon the cord D. By this movement of the cover C the bird is thrown from the box A into the air, and at once rises.

With this trap all annoyance from the refusal of the bird to leave the trap and from the bird's running along the ground before rising is avoided. With this trap, also, when the trap is sprung, the direction in which the bird is thrown and takes flight depends upon the position the bird may have taken in the box A, and cannot be known in advance, as the bird is free to take any position in the trap it may choose, so that the sportsman cannot calculate upon the direction the bird will take, but must depend entirely upon his skill.

I am aware that it is not new to provide a trap with a spring-actuated door having a projection for holding horizontally-revolving weighted arms, but which, when depressed by the weight of the animal, relieves said arms, or to make the arms precipitate the animal into the box; but,

What I claim as new and of my invention is—

The combination of the semi-cylindrical box A, to be sunk in the ground, the cover C, pivoted at its middle, and the cord D, fastened to the middle of the front of the cover, as shown and described, whereby the pigeon may be swept out of the box and thrown up into the air by simply pulling the cord, as specified.

WILLIAM H. HAWES.

Witnesses:
JAMES T. GRAHAM,
C. SEDGWICK.